2,750,374

PRODUCTION OF CASEIN-LACTALBUMIN COPRECIPITATE

Hartley W. Howard, Hastings-on-Hudson, and Harold K. Salzberg, Bainbridge, N. Y., assignors to The Borden Company, New York, N. Y., a corporation of New Jersey No Drawing. Application January 28, 1952, Serial No. 268,680

2 Claims. (Cl. 260—120)

This invention relates to a process of precipitating casein from its aqueous solutions at a pH substantially above the isoelectric point and also for the coprecipitation of casein and lactalbumin from milk.

The solids in milk are in large part protein material which has many important commercial uses aside from its food value, and the separation of milk proteins, especially the casein, has been a matter of much importance in the commercial field. To the present, the two principal methods for recovering casein from milk have been by the use of acid or by the use of rennet. Acidification throws down the casein with a minimum of calcium and other earth metal compounds, whereas rennet throws down the casein and also substantial quantities of calcium salts. Neither method will precipitate the lactalbumin, which has been, in the past, recovered practically only by a heat coagulation procedure.

According to the present invention it is now found that the casein, and also the lactalbumin, can be recovered by addition to the sweet milk, preferably thoroughly skimmed, of a nitrogen compound which is a tertiary nitrogen compound or a quaternary ammonium compound. The ammonium compound may contain also a substituent of at least 11 carbon atoms in the substituent chain. The reaction occurs without regard to the number of carbon atoms in the substituent, but when the carbon number is 11 or more a precipitate of the protein material is obtained which has unusual solubility, as hereinafter described. The reagents are preferably used in the form of salts such as the hydrochloride or chloride or other hydrohalide or halide of the base. (These chloride salts are the preferred form, but they are representative of a wide range of other acid combinations such as the sulfates, salts with the other allied elements, various other inorganic acids, and organic acids.) These compounds show the interesting property of separating the casein and the lactalbumin together from the milk, leaving present in the whey little more than the milk sugar and soluble salts. (The reaction may also be used for the separation of lactalbumin from whey after prior removal of the casein.) The separated protein material may then be removed from the remaining fluid, which is hardly a whey because of the complete removal of protein material. This residual liquid, however, contains also bitamins and various other non-protein materials.

It may be noted that there is a sharp point of inflection in the characteristics of the material precipitated when the number of carbon atoms in the substituent chain on the nitrogen grouping exceeds eleven. If the substituent chain contains 11 or more carbon atoms (without regard to the orientation thereof, whether alkyl, aryl, or aralkyl), the resulting compound between the milk proteins, that is, the casein and lactalbumin, precipitates, being insoluble in water. If the number of carbon atoms in the substituent chain is less than 11, the resulting compound with the milk proteins is water soluble and remains in solution in the carrying water. If a tertiary or quaternary nitrogen compound having no carbon atom substituent, or having carbon atom substituent number less than 11, is to be used, it is usually preferable to separate the casein by well-known methods, dry it, and thereafter treat the dry casein with the nitrogen compound. For this treatment any of the standard mixing devices may be used, or the treatment may be conducted on the double roll mill.

By this procedure there is thus obtained a casein preparation which is neither paracasein nor the ordinary acid precipitated casein, but instead is a mixture of casein and lactalbumin combined with the precipitating agent, with a minimum of calcium compounds. The resulting preparation of milk proteins with the nitrogen compound is relatively insoluble in water alone, but may be readily soluble in mixtures of water and alcohol if the reagent has as part of its structure a substituent of at least 11 carbon atoms. The exact mechanism by which tertiary nitrogen compounds and quaternary ammonium compounds combine with the casein is unknown and the reaction, therefore, is somewhat uncertain and cannot be definitely stated because of difficulties in accurately analyzing systems such as these in which protein is involved. However, a reaction can be offered from analytical values which have been obtained for the halide content of the reagent, the precipitated complex, and the residual whey. It has been found that the halide content of the reagent does not become a part of the casein complex and is found in the residual whey in quantitative amount. From this an equation can be set down as follows:

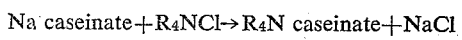

$$\text{Na caseinate} + R_4NCl \rightarrow R_4N \text{ caseinate} + NaCl$$

It may be noted that the casein compound is a very stable compound with no tendency to break down or dissociate and with a high resistance to decay of any sort. It is, however, possible to break down the compound into the original casein and the nitrogen compound by an acid treatment. Thus, regeneration of the original casein can be accomplished by treatment of the complex with acid. For example, if the precipitated complex be separated from its whey and agitated in hydrochloric acid of a strength to provide a hydrogen ion concentration corresponding to a pH of about 3, the complex is converted from its soft, semi-fluid consistency to a firm, grainy curd characteristic of regenerated casein. The complex can therefore be considered as a source of pure regenerated casein obtainable in the form of curd, film, or filament depending upon the mechanical facilities applied at the moment of regeneration. By this means a very pure grade of casein can be obtained.

The procedure also permits of the recovery of very pure lactalbumin. Thus, the casein and the lactalbumin may be precipitated from fresh milk (after thorough skimming to remove butter fat) using a nitrogen compound having a substituent with at least 11 carbon atoms in it to make sure that compounds with casein and lactalbumin both are fully insoluble. These compounds may then be separated from the whey and residual milk sugar, vitamins, mineral salts, and the like and treated with acid to regenerate both casein and lactalbumin. In reasonably dilute solutions, the lactalbumin remains in solution while the casein precipitates. The casein may be filtered out to separate it from the lactalbumin and excess nitrogen compound. Neutralization of the acid then reprecipitates the lactalbumin in combination with a portion of the nitrogen compound. The precipitated lactalbumin may then be filtered out from the excess nitrogen compound and the salt resulting from neutralization of the breakdown acid yielding a relatively pure compound of lactalbumin and the nitrogen compound. Separation can then be effected by various methods such as distillation, fractional crystallization, and the like to yield a pure lactalbumin.

In practicing the invention with milk as the starting material, the whole milk is preferably first carefully skimmed to remove as thoroughly as possible the butter fat components. Skimming, while preferable, is not a necessary step. However, not only does the butter fat have a high value per se, but in many casein uses it interferes with the normal, desired use.

However, the invention in practice need not necessarily be limited to the removal of proteins from natural milk, but can also be applied to artificially prepared solutions of either casein or lactalbumin. For instance, a casein solution may be prepared in the usual manner, that is, by dissolving the casein in water containing sufficient alkali to complete the dispersion. Solutions may be made with either fixed alkalies such as caustic soda or with ammonia; and from these solutions the complex may be precipitated successfully with one or another of the tertiary or quaternary reagents. This permits the conversion of an ordinary casein to the casein complex thus improving it with respect to several properties and uses as described below. The casein complex may be precipitated from alkaline solutions over a wide range of reactivity but, in order to conserve on the amount of reagent necessary to throw down a complex, it is well to prepare the casein solution with the least amount of alkali required to dissolve completely the protein. Also, in order to obtain the complex in relatively pure form without contamination with the by-product, salt, in excessive amount, it is best to prepare the casein solution in rather dilute form.

To the skimmed milk or protein solution, preferably fresh, with a minimum of contained acid, there is then added a small amount of a tertiary nitrogen compound or quaternary ammonium compound, either one of which may contain a substituent in the form of a carbon chain containing at least 11 carbon atoms (if the milk proteins are to be precipitated directly), together with the normal hydrogen atom or alkyl or aryl components. It may be noted that the substituent may contain, in addition to the carbon atoms, a considerable range of secondary substituents; that is, it may contain ester groups or amido groups, or the substituent may be in the form of an aliphatic or aromatic chain, and it does not appear that the amount of branching is particularly significant. There is merely required a chain containing at least 11 carbon atoms if the protein material is to be recovered in the form of an alcohol-soluble precipitate. Other recovery methods may utilize reagents having smaller numbers of carbon atoms in the substituent chain. Thus, if the casein is precipitated by acid or rennet, separated from the whey, and redissolved, the addition of a tertiary nitrogen compound or quaternary ammonium compound having less than 11 carbon atoms yields a product which may be recovered by evaporation or other procedures to yield a separated compound having interesting and valuable properties.

For the precipitant, such tertiary nitrogen bases in the form of their hydrochlorides as the following may be used:

Triethylamine hydrochloride
Triphenylamine hydrochloride
Tri-n-butylamine hydrochloride
Diethyl aniline hydrochloride
2-heptadecyl imidazole hydrochloride
1 - hydroxyethyl - 2 - heptadecyl dihydroimidazole hydrochloride
1-hydroxyethyl-2-heptadecenyl imidazole hydrochloride
1-aminoethyl-2-heptadecenyl imidazole hydrochloride
2-undecyldihydroimidazole hydrochloride These compounds listed are representative of a very large number of salts of tertiary nitrogen bases which are similarly operative.

Alternatively, substantially any of the quaternary ammonium compounds represented by such compounds as the following may be used:

Trimethyl benzyl ammonium chloride (Triton)
Betaine hydrochloride
Choline chloride
Acetyl chlorine bromide
Lauryl pyridinium chloride
Cetyl pyridinium chloride
Cetyl trimethyl ammonium chloride
N(higher acyl esters of colamino formyl-methyl) pyridinium chloride (Emulsept)
Higher alkyl dimethyl benzyl ammonium chloride
Myristoamidopropyl dimethyl benzyl ammonium chloride (Aerosol)
Di-isobutyl phenoxy ethoxy ethyl dimethyl benzil ammonium chloride (Hyamine)

This second group of compounds is representative of the quaternary ammonium compounds each having a substituent containing at least 11 carbon atoms.

Upon the addition of one or more of these compounds to skimmed milk, the casein and the lactalbumin precipitate together with considerable promptness. In some instances the precipitation is substantially complete in a matter of seconds. In other instances the precipitation may require some hours, and in still other instances the precipitation time may lie within a few seconds and some hours.

It should be noted that the physical characteristics of the precipitate can be altered by regulating the stirring as the reagent is added. Vigorous continued stirring produces a finely divided, slow settling precipitate, while stirring just enough to distribute the reagent yields a much more compact curd. Protein concentration is also a factor in this regard, more concentrated solutions giving heavier curds.

Alternatively, the process may be used for the precipitation of the lactalbumin alone. For this purpose the casein may first be precipitated with either acid or rennet and then a tertiary nitrogen compound or quaternary nitrogen compound as above indicated may be added to the residue from which the casein has been separated thereby precipitating the lactalbumin as a separate component.

The properties of a casein complex prepared with reagents of the type subject of this invention differ in several essential respects from the properties of the original casein. These complexes possess a degree of stability in solution not shown by ordinary casein. That is, when subsequently dissolved in alkali, the solution resists deterioration by putrefactive micro-organisms and will keep in good condition for many days.

Another noticeable change which can be made is with respect to solubility. Ordinary casein is not soluble in alcohol or in alcohol-water combinations without the use of auxiliary alkalies. On the other hand, the complexes made with the reagents having a substituent of high molecular weight dissolve in combinations of water and ethyl alcohol in proportion from about 20 parts of water and 80 parts of ethyl alcohol to 50 parts of water and 50 parts of ethyl alcohol, and these solutions are readily formed at room temperature. Combinations of water and ketones such as methyl ethyl ketone are also good solvents for these complexes. No alkali is required in making the solutions. The casein has also been improved in substantial degree with respect to the flexibility of films prepared from the solutions referred to. Also, the water-resistance of these films is substantially better than those which are formed from alkali solutions of ordinary casein.

The solutions of the complexes containing a substituent of high molecular weight exhibit the valuable properties of being effective adhesives for materials which have an oily or a waxy coating, such as the adhering of paper labels to new tin cans and the sticking of wax coated paper or fabric to other adherent. Coatings or adhesive joints are fast drying in view of the high volatility of the alcohol or ketone portion of the solvent. Because of the presence of the long carbon substituent and the solvent, solutions of these complexes are compatible with such other materials as zein in alcohol solution and shellac in alcohol solution, and thus they offer promise as ingredients in printing inks.

The relatively high resistance of these compounds in which the nitrogen compound substituent has 11 or more carbon atoms makes them particularly desirable for a wide range of commercial uses. Excellent filaments are obtainable merely by extruding a solution of the casein-nitrogen compound material through spinerets into a suitable coagulating medium, which may be a considerable quantity of rapidly flowing water, to dilute and remove the alcohol or other spirit solvent from the material, or may be a current of hot air to obtain a rapid evaporation of solvent, or may be a wide range of other compounds such as acid of a strength sufficient to combine with the spirit in the solvent and simultaneously to dehydrate the filament; or as will be obvious to those skilled in the art a wide range of other coagulating baths are usable. Alternatively, filaments may be produced by coating the material on a roll, coagulating on the roll, and stripping off the coagulated sheet. Alternatively, almost any of the other well known methods of forming filaments may be used by minor modifications of the coagulating baths.

A substantial number of advantageous methods of practicing the present invention are shown in the following examples:

Example 1

To skimmed milk at 100° F. was added the hydrochloride salt of trimethyl benzyl ammonium chloride, which was present in water solution. Under rapid and continual stirring there were obtained white flocs of a precipitate comprising the combination of casein and the reagent. Addition of the reagent was stopped when no more curd formed. The curd was separated from the whey and dewatered by pressing. The whey had a pH of 6.7. The wet curd was dissolved in water containing ammonia to yield a solution of pH 7.0. This solution remained sweet and unchanged on the laboratory shelf for at least two weeks.

Example 2

To a solution of 10 g. of ordinary casein in one liter of water, containing enough sodium hydroxide to dissolve the casein just about completely when heated to 150° F., there was added a solution of triethylamine hydrochloride in water in amount sufficient to remove all casein completely from solution in the form of curds comprising the complex. The curds were separated from the whey and dewatered by pressing. The whey had a pH of 6.5. The wet curd dissolved in water containing ammonia to a solution which withstood deterioration through putrefaction for a period of at least two weeks.

Example 3

To skimmed milk at 100° F. was added the hydrochloride salt of 1-hydroxyethyl-2-heptadecenyl imidazole with stirring until the casein was completely curded and the whey clear. This required one part by weight of the agent to 100 parts of skimmed milk. The curd was separated, dewatered by pressing, and dried at 100°–120° F. The product was dissolved in a mixture of equal parts by weight of isopropyl alcohol and water to yield a viscous solution of adhesive properties.

Example 4

A solution of 50 g. of casein in 245 cc. of water and 5 cc. of 26° Bé. ammonia was prepared and diluted to 1200 cc. To this was added 2 cc. of a 50% solution of alkyl dimethyl benzyl ammonium chloride (Zylium F–1). A curd and a clear whey of acidity corresponding to pH 5.82 were obtained. This pH value is substantially higher than the isoelectric point of casein at 4.5, where casein is normally precipitated with acids. The pressed but undried curd was taken up in ethyl alcohol. From this solution a film was cast and dried, as a demonstation of the film-forming characteristics of the casein complex.

Example 5

Since the casein complex is soluble in mixtures of water and alcohol, it can be prepared without precipitation by adding the reagent to a solution of casein in a mixture of water and alcohol. To 100 g. of casein swollen in 74 g. of water and 135 g. is isopropanol was added 30 cc. of a 10% aqueous sodium hydroxide solution. After heating to complete the solution, 48 cc. of a 50% solution of myristoamido-propyl dimethyl benzyl ammonium chloride (Aerosol M) was stirred in. The resulting clear amber solution of pH 7.0 and of about 36% solids content had strong adhesive properties and good storage stability. Dried films from this solution were clear, smooth, and thermoplastic upon application of heat.

Example 6

The order of contact between casein solution and reagent was reversed from that used in the previous examples. 50 g. of casein were dissolved in 245 cc. of water with the help of 5 cc. of ammonia and heat. Upon cooling, the solution had a pH value of 8.8. After dilution with an equal volume of water, the solution at room temperature was extruded into a mixture of 8 g. of Ahcovel A, a quaternary ammonium compound, and 72 cc. of water having pH of 4.5, also held at room temperature. Immediate coagulation of the casein occurred yielding the complex in the shape of filaments. These were removed and were observed to dry quickly in the air.

Example 7

A second experiment involved extrusion of the same casein solution into the same solution of reagent but also containing 4 cc. of formalin of 40% strength. Immediate coagulation occurred and the resulting filaments were observed to be stronger than when extruded in the absence of formalin. This procedure constitutes a method of obtaining the casein complex in a form of one small dimension and thus readily handled for drying.

Example 8

A semi-dry product was obtained by adding 12 g. of a 50% aqueous solution of myristoamidopropyl dimethyl benzyl ammonium chloride to 25 g. of casein which had been wetted with 30 cc. of water, then bringing the pH of the mass to 7.4 by adding sodium hydroxide solution. The resulting paste was completely soluble in 2 parts by weight of isopropyl alcohol or of methyl ethyl ketone.

Example 9

560 ml. whey (resulting from the removal of casein from milk by isoelectric precipitation with hydrochloric acid) was adjusted to pH 6.8 with sodium hydroxide and treated with 11 ml. of a 10% solution of high molecular alkyl-dimethyl-benzyl-ammonium chloride (Roccal). The lactalbumin-reagent complex settled out as a fairly compact mass inside one hour and was removed by filtration.

Example 10

To one quart of skimmed milk, warmed to 27° C., were added 133 g. of a 10% solution of high molecular alkyl-dimethyl-benzyl-ammonium chloride (Zylium F1). The proportions here corresponded to approximately 2.5 g. protein per gram of precipitating reagent. The protein-reagent-complex precipitated immediately and settled well. It was removed by filtration and washed with water. The wet curd, stirred with 300 ml. methanol and 300 ml. chloroform, dissolved to form a practically clear solution.

These examples show the simplicity, effectiveness, and utility of the present invention and present a new precipitant for milk proteins by which a new and superior quality of milk protein is obtained and a higher yield obtained.

While there are above disclosed but a limited number of embodiments of the material and process of the present invention it is possible to provide still other embodiments without departing from the inventive concept herein disclosed, and it is therefore desired that only such limitations be imposed on the appended claims as are stated therein or required by the prior art.

The invention claimed is:

1. In coprecipitating casein and lactalbumin from milk, the process which comprises mixing the milk with a cationic surface active agent selected from the group consisting of tertiary amine salts and quaternary ammonium salts, the pH of the milk being substantially above the isoelectric point for the casein and at least as high as about 5.82 and the temperature being below that of heat coagulation of the lactalbumin, and maintaining the contact between the milk and said agent until the casein and lactalbumin are coprecipitated.

2. In coprecipitating casein and lactalbumin from milk, the process which comprises mixing the milk with a cationic surface active agent selected from the group consisting of tertiary amine salts and quaternary ammonium salts, the pH of the milk being substantially above the isoelectric point for the casein and the temperature being below that of heat coagulation of the lactalbumin, and maintaining the contact between the milk and said agent until the casein and lactalbumin are coprecipitated, the said cationic agent containing an alkyl substituent with at least 11 carbon atoms.

References Cited in the file of this patent

UNITED STATES PATENTS

| | | |
|---|---|---|
| 1,772,131 | Davidson et al. | Aug. 5, 1930 |
| 1,981,588 | Dunham | Nov. 20, 1934 |
| 2,145,856 | Bley | Feb. 7, 1939 |
| 2,262,770 | La Piana | Nov. 18, 1941 |
| 2,300,907 | Bronson | Nov. 3, 1942 |
| 2,374,667 | Dangelmyer | May 1, 1945 |
| 2,516,531 | Shibe | July 25, 1950 |

OTHER REFERENCES

Schmidt: Zeit. physiol. Chem., vol. 277, pp. 117–34 (1943).

Anson et al.: "Advances in Protein Chem." (Academic Press), vol. IV, pp. 82–87 (1948).